(12) United States Patent
Love et al.

(10) Patent No.: US 9,184,898 B2
(45) Date of Patent: Nov. 10, 2015

(54) CHANNEL QUALITY INDICATOR FOR TIME, FREQUENCY AND SPATIAL CHANNEL IN TERRESTRIAL RADIO ACCESS NETWORK

(75) Inventors: Robert T. Love, Barrington, IL (US);
Raja S. Bachu, Des Plaines, IL (US);
Brian K. Classon, Palatine, IL (US);
Ravikiran Nory, Grayslake, IL (US);
Kenneth A. Stewart, Grayslake, IL (US); Yakun Sun, Evanston, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2423 days.

(21) Appl. No.: 11/194,224

(22) Filed: Aug. 1, 2005

(65) Prior Publication Data

US 2007/0026810 A1    Feb. 1, 2007

(51) Int. Cl.
*H04B 1/00* (2006.01)
*H04B 7/00* (2006.01)
*H04L 5/00* (2006.01)
(Continued)

(52) U.S. Cl.
CPC .............. *H04L 5/0091* (2013.01); *H04B 7/063* (2013.01); *H04B 7/066* (2013.01); *H04B 7/0632* (2013.01); *H04B 7/0697* (2013.01);
(Continued)

(58) Field of Classification Search
CPC ..... H04L 5/006; H04L 5/0007; H04L 1/0003; H04L 1/0026; H04L 25/0228; H04L 5/0057; H04L 1/1893; H04W 72/082; H04W 52/0206; H04W 24/08; H04W 24/10; H04W 36/30; H04B 7/0632; H04B 1/1027

USPC ............... 455/63.1, 67.11, 67.13, 436, 452.2, 455/509, 513, 517, 524, 525, 69, 450–451, 455/452.1, 522, 501; 370/203, 206, 252, 370/329, 330, 331, 341, 343, 208, 465, 370/485; 375/260, 144, 148, 267
See application file for complete search history.

(56) References Cited

U.S. PATENT DOCUMENTS 6,600,917 B1 * 7/2003 Maupin ..................... 455/414.1
6,934,275 B1    8/2005 Love et al.
(Continued)

FOREIGN PATENT DOCUMENTS

| EP | 1473956 A2 | 11/2004 |
| JP | 2005160079 | 6/2005 |
| WO | 2004112288 A1 | 12/2004 |

OTHER PUBLICATIONS

Motorola "COI Feedback Scheme for EUTRA" 3GPP TSG Ran #43 (On Line) Nov. 7, 2005; XP002404198.
(Continued)

*Primary Examiner* — Olumide T Ajibade Akonai
(74) *Attorney, Agent, or Firm* — Faegre Baker Daniels LLP

(57) ABSTRACT

A wireless communication terminal that communicates on a plurality of sub-carriers divided into a plurality of frequency bands, wherein each frequency band includes at least one sub-carrier. The terminal measures a channel quality indicator (CQI) for a plurality of frequency bands, identifies a subset of frequency bands for which the channel quality indicator has been measured based on a subset criterion, and transmits a report identifying a subset of frequency bands for which a channel quality indicator has been measured or frequency bands not in the subset. In some embodiments, the report also includes a subset CQI value associated with at least the subset of frequency bands identified.

13 Claims, 3 Drawing Sheets

(51) Int. Cl.
  *H04B 7/06* (2006.01)
  *H04L 1/00* (2006.01)
  *H04W 72/08* (2009.01)

(52) U.S. Cl.
  CPC .......... *H04L 1/0026* (2013.01); *H04L 5/0046* (2013.01); *H04W 72/08* (2013.01); *H04L 5/0007* (2013.01)

(56) References Cited

U.S. PATENT DOCUMENTS

| | | | |
|---|---|---|---|
| 7,218,948 B2* | 5/2007 | Laroia et al. | 455/522 |
| 7,388,847 B2* | 6/2008 | Dubuc et al. | 370/329 |
| 7,457,588 B2 | 11/2008 | Love et al. | |
| 7,715,488 B2* | 5/2010 | Pedersen et al. | 375/267 |
| 7,720,504 B2* | 5/2010 | Murata et al. | 455/550.1 |
| 2005/0025039 A1* | 2/2005 | Hwang et al. | 370/206 |
| 2005/0068884 A1 | 3/2005 | Yoon | |
| 2005/0105589 A1 | 5/2005 | Sung | |
| 2005/0128993 A1 | 6/2005 | Yu et al. | |
| 2005/0164644 A1* | 7/2005 | Shinoi et al. | 455/69 |
| 2005/0207367 A1* | 9/2005 | Onggosanusi et al. | 370/315 |
| 2005/0276258 A1* | 12/2005 | Gu | 370/349 |
| 2006/0057965 A1* | 3/2006 | Braun et al. | 455/67.11 |
| 2006/0146856 A1* | 7/2006 | Jung et al. | 370/431 |
| 2006/0221883 A1* | 10/2006 | Damnjanovic et al. | 370/315 |
| 2006/0274712 A1* | 12/2006 | Malladi et al. | 370/345 |
| 2007/0026808 A1* | 2/2007 | Love et al. | 455/67.7 |
| 2007/0121543 A1* | 5/2007 | Kuchibhotla et al. | 370/329 |
| 2008/0207135 A1* | 8/2008 | Varadarajan et al. | 455/69 |

OTHER PUBLICATIONS

European Patent Office, "European Search Report" for European Application No. 10011122.8 D02 Nov. 24, 2010, 7 pages.
European Patent Office, "European Search Report" for European Application No. 10011145.9 D01 Nov. 30, 2010, 7 pages.
3GPP TSG-RAN1 WG1 #42bis, San Diego, USA "CQI report and scheduling procedure" Samsung, Oct. 10-14, 2005, R1-051045, 4 pages.
European Patent Office, Office Action for European Patent Application No. 10011145.9 (related to above-captioned patent application), mailed Jun. 5, 2014.

* cited by examiner ents via the network 100 and other networks, for example, the PSTN or PDN, as is also known generally by those having ordinary skill in the art.

In FIG. 2, the exemplary wireless terminal 200 comprises a processor 210 communicably coupled to memory 220, for example, RAM, ROM, etc. A wireless radio transceiver 230 communicates over a wireless interface with the base stations of the network discussed above. The terminal also includes a user interface (UI) 240 including a display, microphone and an audio output among other inputs and outputs. The processor may be implemented as a digital controller and/or a digital signal processor under control of executable programs stored in memory as is known generally by those having ordinary skill in the art.

In FIG. 1, the base stations 110 each include a scheduler for scheduling and/or allocating resources to mobile terminals in the corresponding cellular area. In schemes such as Orthogonal Frequency Division Multiple Access (OFDMA), multi-carrier access, or multi-channel CDMA wireless communication protocols including, for example, 802.16e, multi-carrier HRPD-A in 3GPP2, and the long term evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler. Generally, to enable FS scheduling by the base station scheduler, each mobile terminal must provide a per frequency band channel quality indicator (CQI).

In OFDM and other communication protocols and formats where CQI reporting by the mobile station may be useful, the channel generally comprises a plurality of sub-carriers divided into a plurality of frequency bands, wherein each frequency band includes at least one sub-carrier. A sub-carrier may comprise concatenated carriers or individual carriers. For example, in CDMA multi-carrier systems, a carrier may be a sub-carrier wherein each frequency band has at least one sub-carrier.

In the exemplary process 300 of FIG. 3, at 310, the mobile terminal measures a channel quality indicator (CQI) for each of a plurality of frequency bands. In an OFDM system, a band may be as small as a single subcarrier or comprise multiple sub-carriers, for example, 15 or 25 sub-carriers. The number of frequency bands measured may cover more than one spatial subchannel as generated with a MIMO type transmitter and receiver involving multiple transmit and receive antennas. The CQI measurements are generally performed periodically, for example, on a frame by frame or multi-frame basis. Alternatively, CQI measurements may be requested by the network, or a mobile terminal may autonomously transmit an unsolicited CQI measurement report, for example, if an excessive time period has elapsed between delivery of a prior CQI report and the current time.

The link may operate in a frequency selective (FS) or a frequency non-selective (FNS) mode, or in other modes, for example, hybrid or semi-selective modes. Typically, in FS mode, there is FS (band-specific) CQI reporting and (unless the BS decides otherwise) FS scheduling. Likewise for an FNS mode, FNS CQI reporting and scheduling are performed in that mode. The FS and FNS modes may be used, for example, with low speed (low Doppler) operation and high speed operation, respectively. However, FNS mode may be used in low speed operation as well, for example, to reduce CQI feedback or for scheduler multiplexing reasons. Band specific FS reporting may also be used for FNS scheduling at the cost of increased CQI feedback. In FNS mode, the plurality of frequency bands typically covers a wideband channel wherein substantially the entire bandwidth of the allocated

CHANNEL QUALITY INDICATOR FOR TIME, FREQUENCY AND SPATIAL CHANNEL IN TERRESTRIAL RADIO ACCESS NETWORK

FIELD OF THE DISCLOSURE

The disclosure relates generally to wireless communications, and more particularly to reporting channel quality information (CQI) for a plurality of frequency bands, wherein each frequency band includes one or more sub-channels and wherein the CQI report is useful for scheduling in communication systems, for example, in Orthogonal Frequency Division Multiple Access (OFDMA) systems, and related methods.

BACKGROUND

In Orthogonal Frequency Division Multiple Access (OFDMA) based wireless communication protocols and other protocols based on multi-carrier modulation methods, scheduling optimization can be performed in the time and frequency dimensions using a Frequency Selective (FS) scheduler. Idealized FS scheduling may result in as much as a 50% improvement in system throughput relative to Frequency Non-Selective (FNS) scheduling. FNS scheduling occurs in a Time-Division, Code Division Multiple Access (TD-CDMA) physical layer, which effectively permits scheduling only in the time domain. It is known generally for each mobile terminal, or equivalently User Equipment (UE), to provide a per-frequency band channel quality indicator (CQI) to enable FS scheduling by a Base Station (BS) scheduler.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
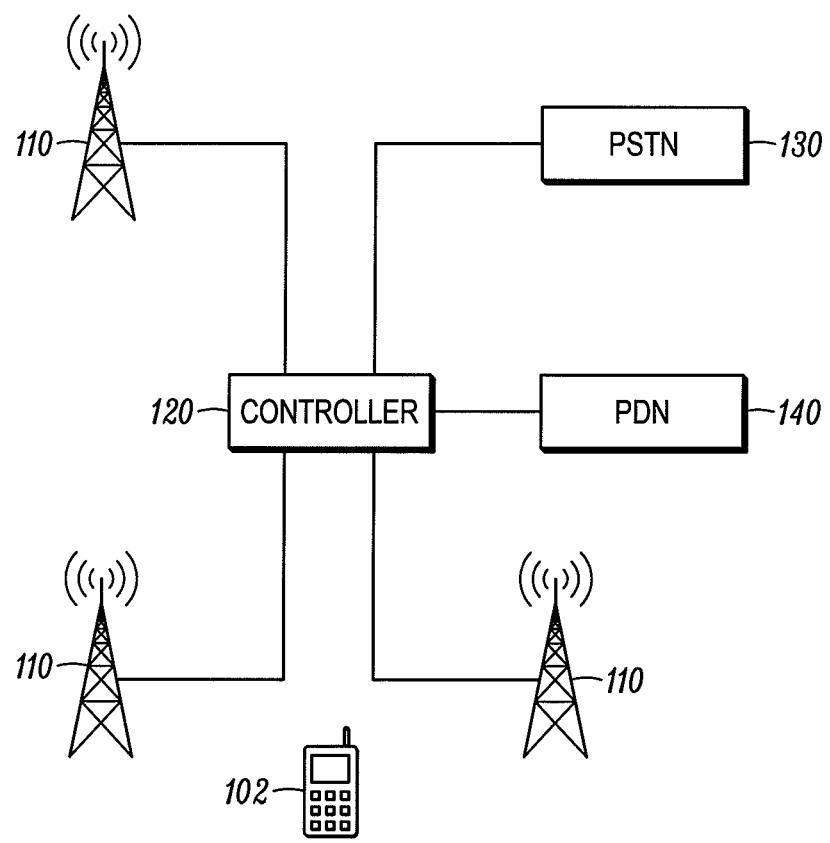
FIG. 1 illustrates an exemplary wireless communication system.
Figure 2:
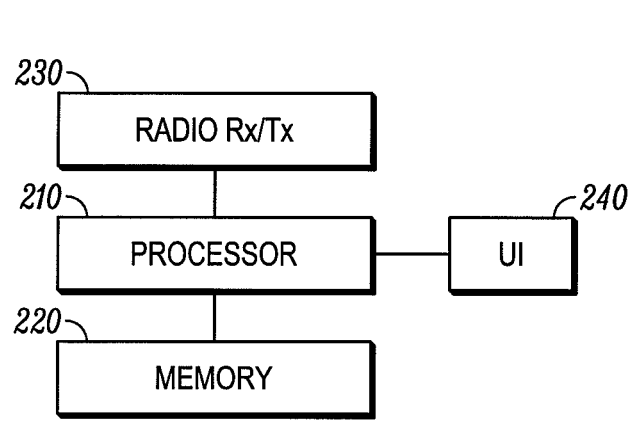
FIG. 2 is an illustrative wireless communication terminal.

In FIG. 1, the exemplary wireless communication system comprises a cellular network including multiple cell serving base stations 110 distributed over a geographical region. The cell serving base stations or base station transceivers 110 are also commonly referred to as cell sites wherein each cell site consists of one or more cells, which may also be referred to as sectors. The base stations are communicably interconnected by a controller 120 that is typically coupled via gateways to a public switched telephone network (PSTN) 130 and to a packet data network (PDN) 140. The network also comprises management functionality including data routing, admission control, subscriber billing, terminal authentication, etc., which may be controlled by other network entities, as is known generally by those having ordinary skill in the art. Wireless mobile terminals, for example, cellular handset 102, communicate voice and/or data with each other and with frequency resources, which may be disjoint, is considered. In FNS mode, the measured CQI for each of a plurality of frequency bands may be expressed as a single FNS (or wideband) CQI. In FS mode, each of the plurality of frequency bands measured may be a narrowband channel where the totality of narrowband information may still represent a wideband measurement. The CQI for each of the plurality of frequency bands may be termed FS (or narrowband) CQIs.

The UE may autonomously switch between wideband and narrowband CQI operation, or may do so under instruction from the base station. In the former case, the UE may signal such a change of CQI mode to the base station via physical layer signaling or MAC layer signaling. It is also possible, but perhaps less efficient, to always send a band-specific CQI report. For example, such a report in the context of FS CQI reporting could allow the scheduler to determine whether to schedule in an FS or FNS manner based on details of the CQI report itself, as well as additional UE-specific information (e.g., user-specific Doppler frequency estimate) or additionally signaled information. The selection of FS or FNS scheduling may also be determined by the propagation channel multipath delay profile or mobile terminal capability as well as the service or traffic type supported, for example, packet data requiring a conversational service class Quality of Service (QoS) such as Voice over IP (VoIP), or packet data requiring best effort service such as web browsing or HTTP service. FNS scheduling may be applied, for example, to specific QoS classes or to cases where the multipath channel is not frequency selective, such as a "flat" fading channel where the channel magnitude frequency response is invariant with frequency, or an AWGN channel, or to the case when the CQI reporting rate is not fast enough to account for band CQI variations due to a high Doppler frequency.

The plurality of frequency bands, in terms of band size and number of bands, allocated to each mobile terminal may be determined based on one or more or any combination of uplink system load, traffic type, mobile terminal class, estimated channel Doppler, channel frequency selectivity, coherence bandwidth, cell frequency reuse, achievable SNR, achievable payload, and/or standard deviation of the band CQI. Also, the plurality of frequency bands allocated to a mobile terminal may be split into different groups or channels. In some embodiments, the scheduler determines the frequency bands for which CQI measurements will be made by the mobile station. In these embodiments, the mobile station may receive information, for example, a message, identifying the plurality of frequency bands for which the CQI is to be measured before measuring. Generally, the identities of the frequency bands for which measurements are to be may vary. In other embodiments, the mobile station determines the frequency bands for which measurements will be made. In some embodiments, this information is reported to the scheduler either before or after making the measurements.

In some embodiments, the mobile terminal or user equipment (UE) estimates CQI. According to one method, the UE computes the wideband or narrowband CQI using a common or dedicated reference symbol provided by the base station transmission. Alternatively, the UE may compute a CQI based on a combination of pilot and data symbols, or based on data symbols alone. The CQI reported over the pilot symbols may not match the CQI reported over the data symbols since the pilot symbols may be transmitted in every information frame and may occupy the same time frequency locations in adjacent cells, and the collision and hence interference statistics may be different between the pilot and data observations. In this case, the UE may apply a filter or non-linear operator in the frequency-domain to smooth out non-uniform collision events in frequency. In this case, for synchronous networks, the UE may also perform CQI estimation based on jointly processing the surrounding synchronization or channel sequence symbols from neighboring base stations. The base station may also modify reported CQI measurements based on knowledge of data transmissions from other base stations, or the base station may instruct the UE to do so by providing the necessary network configuration data via signaling.

Figure 3:
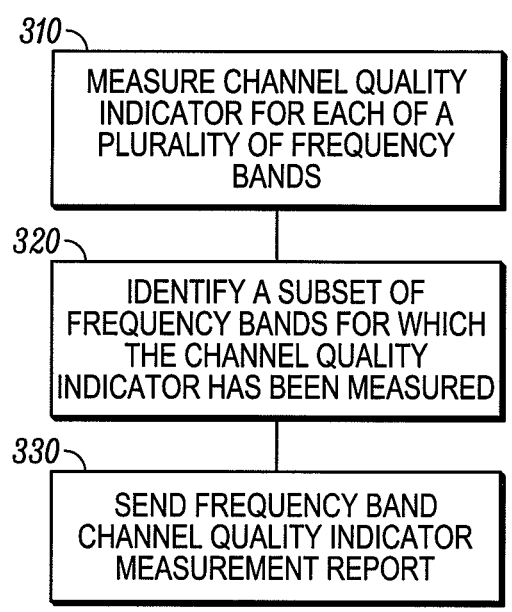
FIG. 3 is an exemplary process flow chart.

In FIG. 3, at 320, the mobile terminal identifies a subset of frequency bands for which the CQI has been measured based on a subset criterion. The maximum size of the subset is generally less than a number corresponding to the number of frequency bands for which CQI measurements were made. In some embodiments, there is a limit on the number of frequency bands that may be in the subset. For example, the maximum size of the subset may be less than the number of frequency bands for which CQI measurements were made, although in some other embodiments the maximum size of the subset may be equal to the number of frequency bands for which measurements were made.

In one embodiment, a reference CQI is identified based on one or more frequency band CQI measurements, or noise or interference estimates. Additional frequency bands may be identified having a measured CQI within a difference metric or specified distance of the reference CQI. In one embodiment, the subset of frequency bands for which the CQI has been measured is identified based on a subset criterion based at least partly on Doppler frequency. In another embodiment, the subset of frequency bands is identified using subset criterion based at least partly upon either traffic type or the data service supported by the network in which the wireless communication device operates. The subset criterion may also be based on uplink system load.

A more particular example is to identify the subset of frequency bands as being all frequency bands having a measured CQI within a specified distance, for example, within x dB, of the frequency band having the best or highest CQI. The distance x dB may be, for example, 0.5 dB, 1.0 dB, 3.2 dB, or the like. In some applications, the distance is known or specified by the base station scheduler. Using the second best CQI, median CQI, or a percentage, for example, 90%, of the highest CQI as the reference CQI could reduce the likelihood that a rogue peak or CQI data outlier would unduly reduce the size of the frequency band subset. Alternatively, the reference CQI may be based on an average of several CQI measurements. Generally, the one or more frequency bands having a CQI used as the basis for the reference would also be part of the subset. In other embodiments, the subset of frequency bands is selected based on one or more criteria that maximizes the data rate or based upon the optimization of some other performance metric. If the subset of frequency bands is identified using, for example, a CQI distance, then information on the CQI of the frequency bands not in the subset will be known at the scheduler. Subsequently, as discussed further below, a single CQI value associated with the subset of frequency bands (e.g., the reference or average or median CQI) and the corresponding subset of frequency bands may be transmitted in a CQI report. In embodiments where measurements are made periodically, as discussed further below, the bands and number of bands in the selected subset may change.

In FIG. 3, at 330, the mobile terminal sends information identifying the subset of frequency bands for which the CQI has been measured and/or identifies frequency bands not in the subset of frequency bands for which the CQI has been measured. The information identifying which frequency bands are in and/or are not in the subset of frequency bands is referred to as a frequency band map. A frequency band map may be a list of frequency band identification numbers (e.g., bands 1, 2 and 7 out of 10 bands). The frequency band map may also be a simple binary bit map with each entry having one or more bits indicating whether a band is or is not in the subset of frequency bands. Alternatively, each frequency band map entry may indicate membership in the subset of frequency bands. In some embodiments, the bit map may also indicate CQI rank. Also, in some embodiments, the bit map provides CQI information for bands adjacent to the bands in the subset as discussed further below.

In embodiments where the wireless communication device communicates on different channels, the information or reports identifying the subset of frequency bands for which the CQI has been measured on each channel may be sent on some type of rotation basis. For example, where the mobile station monitors frequency bands on first and second channels, the CQI reports for each channel may be sent alternately. In embodiments where there are more than two channels, reporting may be on a round robin basis. Other reporting schemes or schedules may also be used.

Figure 4:
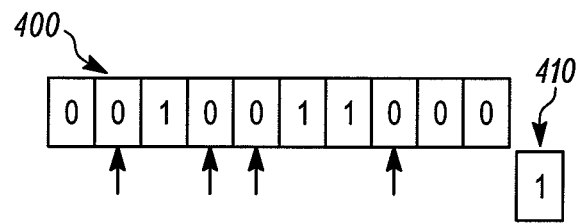
FIG. 4 is an illustrative channel quality indicator (CQI) information or measurement report.

In one embodiment, the mobile terminal sends a bit map identifying the subset of frequency bands for which the CQI has been measured. FIG. 4 illustrates an exemplary bit map 400 having a bit location for each of the plurality of frequency bands for which a CQI was measured. Each bit corresponds to one of the frequency bands for which CQI measurements were made. In FIG. 4, the bits set to "1" indicate that the corresponding frequency band is in the subset of selected frequency bands. In other embodiments, selected bands may be indicated with a zero bit.

In some embodiments, the mobile terminal sends with the CQI report additional information related to the CQI measured for the subset of frequency bands. In one particular embodiment, the additional information is a function. One such function is a subset CQI value associated with at least the subset of frequency bands. The subset CQI value may be based on one or more of a reference CQI used to determine the subset of frequency bands, an average of the CQI measured for the subset of frequency bands, a minimum CQI measured for the subset of frequency bands, a maximum CQI measured for the subset of frequency bands, a median CQI measured for the subset of frequency bands, or some other statistic or measure derived from the subset of frequency bands. The function is commonly understood, or known, by both the BS and UE. While this additional information may be part of the report, for example, the bit map, it may also be communicated separately in some embodiments.

Thus in some embodiments, the UE provides the network scheduler with additional information about the selected subset of frequency bands. The information may be used, for example, to normalize and permit direct comparisons of reports by more than one UE, to handle contention for each frequency band by multiple mobile terminals that are active in the served cell and send CQI reports, and/or to select the transmission data rate (e.g., modulation, coding rate, etc.) for the mobile terminal. This information may be encoded for transmission by a variety of well-known methods, such as linear quantization, non-linear quantization, vector quantization in case more than one such measure is to be transmitted.

In some embodiments, the mobile terminal sends with the CQI report additional information, for example, one or more additional bits indicative of CQI measurement information for bands not in the selected subset. This additional information could be used by the scheduler to avoid scheduling conflicts. In FIG. 4, for example, the additional bit 410, which is included as part of the bit map 400, is indicative of a CQI measured for first and second frequency bands located on adjacent sides of at least one of the frequency bands in the subset of frequency bands, wherein the first and second frequency bands are not in the subset of frequency bands. This information may indicate, for example, that the non-selected frequency bands on adjacent sides of the selected frequency bands are all within some specified distance, e.g., x dB of the corresponding selected frequency band. The distance may be specified by the BS or UE or it may be established a priori at time of manufacture. The distance x may be 0.25 dB, 2.5 dB or the like, and may be different than a distance (if any) used to determine the subset of frequency bands. Such a distance could be static or semi-static and could be determined and signaled by the network. In FIG. 4, as an example, bit 410 is set to '1', indicating that the frequency bands adjacent to the selected bands are all within x dB of the selected frequency bands or some other reference, which may be known to the scheduler.

In another embodiment, the mobile terminal sends a plurality of additional bits with the bit map, wherein each of the plurality of additional bits correspond to each of the frequency bands in the subset of selected frequency bands. In this embodiment, each of the plurality of additional bits is indicative of a CQI for at least one frequency band adjacent to the frequency band to which the additional bit corresponds. In this latter example, if a bit corresponding to a selected band is set, e.g., 1, then the scheduler would know that the non-selected bands adjacent to the selected band are within a specified distance, for example, x dB, of the selected band or some other reference. If a bit corresponding to a selected band is not set, e.g., 0, then the scheduler would know that the non-selected bands adjacent to the selected band are not within the specified distance of the selected band.

Figure 5:
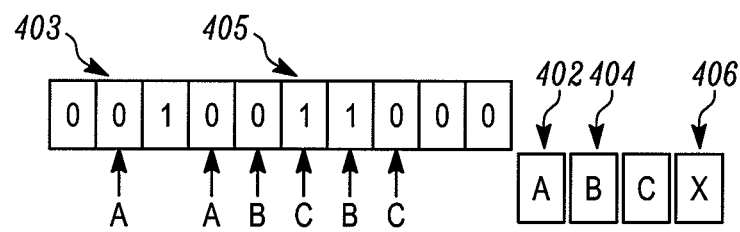
FIG. 5 is another illustrative CQI information report.

In FIG. 5, additional bit 402 provides information about frequency bands "A" adjacent to the selected band to which bit 402 corresponds. For example, setting bit 402 to a "1" or to a "0" may be indicative that bits "A" adjacent to bit 403 are within some distance of a reference CQI. Additional bit 404 provides information about frequency bands "B" adjacent to the selected band to which bit 405 corresponds, etc. The number of additional bits sent may be fixed (e.g., 4) or variable up to a maximum. If the number of additional bits is less than the size of the subset, the bits correspond to the frequency bands in the subset in a predetermined order (e.g., left to right, right to left, smallest identification number first, etc.). If the number of additional bits is larger than the size of the subset, some of the additional bits may be transmitted but not used. For example, FIG. 5 shows four additional bits, but the size of the subset (in the example) is three. Thus bit 406 is not used.

Figure 6:
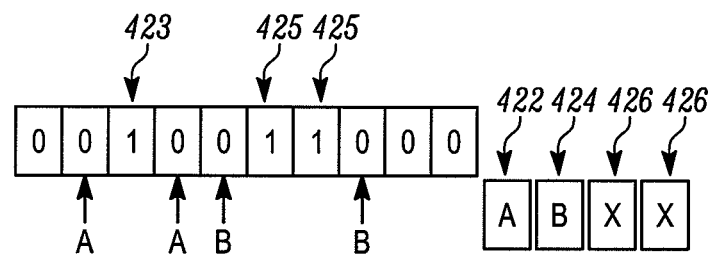
FIG. 6 is another illustrative CQI information report.

In another embodiment each additional bit corresponds to a grouping of one or more contiguous bits corresponding to selected bands. FIG. 6, for example, additional bit 422 provides information about frequency bands "A" adjacent to a first selected band 423. Additional bit 424 provides information about frequency bands "B" adjacent to the selected bands corresponding to adjacent bits 425. In this exemplary embodiment, the bits 426 are not used, since the number of additional bits (4) is larger than necessary to represent the separate groupings 423 and 425 of bits in the subset.

In other embodiments, additional information may be provided on the other bands, such as an indication of the frequency selectivity. The frequency selectivity indication may be an absolute indication, for example, an average CQI of the non-selected bands, average and variance of CQI of the non-selected bands, exponential effective SIR mapping (EESM) SNR and beta value for the non-selected bands. EESM mapping is described in "Considerations on the System-Performance evaluation of HSDPA using OFDM modulation", 3GPP TSG_RAN WG1 #34, R1-030999, October, 2003. The additional information may be useful when attempting to provide a peak data rate to a user using substantially all of the bandwidth, or when attempting to assign to a user a band adjacent to a selected band due to other users preferring the selected band. EESM and other schemes are useful when selecting a single optimal modulation and coding scheme (MCS) assignment to frequency resources with frequency selectivity present, such as for a set of non-selected bands or more generally for one or more sets of bands, where the union of sets may be the total bandwidth. For example, an EESM report may be made for selected and non-selected bands. Feedback may be reduced by allowing more selectivity in the set of selected bands and relying on the EESM procedure to allow optimal data rate selection.

In another embodiment, a control channel may contain the same information as a FS CQI report, for example, a bitmap of allocated bins, MCS values per bin, etc., as discussed above. The control channel resource allocation or assignment can be reduced in size by having the UE retain CQI report information, wherein reported information is used with a future partial assignment to fully construct the assignment. For example, consider a 20 MHz nominal bandwidth system that is divided into 96 bins (or bands, subchannels, chunks) of 200 kHz each, with CQI report information of 2 bits per bin for a CQI or MCS value. In one embodiment, the scheduler and UE both know how to compute MCS from CQI (or CQI is fed back directly), so that while bins are allocated the MCS for the bin need not be explicitly transmitted. This may be especially useful if many bands are assigned to the UE in a frame. A CRC or additional channel coding may be optionally used to improve the quality of the feedback message to avoid having feedback reliability limit performance on the other link. In a TDD system, the uplink/downlink boundary may be optimally set to maximize system throughput without becoming uplink (or downlink) limited. In one embodiment, the subset CQI value may be associated by both the UE and scheduler to a particular modulation, for example, by comparing the subset CQI value to several dB thresholds (e.g., <8 dB QPSK, 8 dB<16QAM<12 dB, 64QAM>12 dB). The partial control assignment made by the scheduler would not include a modulation, and the UE would use the sent CQI report with the partial control assignment to construct a full control assignment that includes the modulation.

The CQI may be transmitted by reporting SNR or another SNR-related metric applicable to a pilot symbol broadcast over the entire cell also referred hereto as Global Reference Symbol (GRS). A dedicated pilot CQI can be used to service handoff decisions. The dedicated CQI can be wideband or narrowband depending on the time-resource allocation granted by network. A CQI based on a Global Reference Symbol (GRS) does not necessarily reflect the interference level over the data portion of the frame. In synchronous networks, if a TDM approach to GRS is adopted and if GRS is transmitted at full power by all cells and UE processes GRS without regard to adjacent cells (i.e., cells specified in neighbor list), then the GRS CQI metric may indicate a lower achievable SNR than during OFDM symbols assigned to data where the effective utilization of the frequency resource may be less and so interference levels are lower. A problem could occur in asynchronous networks provided two adjacent cells are aligned in time. The network would need to be specified as synchronous with frame staggering to ensure alignment of GRS with data symbols from adjacent cells. One potential solution is to provide a limited set of reference symbols within OFDM symbols assigned to data to permit CQI generation that reflects the actual interference load during the data portion of the frame. Such a set of embedded reference symbols could be the same symbols used for dedicated pilot provisioning.

The described frequency band mapping and CQI reporting procedure is also applicable in the case of multiple spatial channels as achieved with a MIMO scheme using multiple antennas at the transmitter and receiver. The difference being that the band subset now consists of all the frequency bands of the multiple spatial channels instead of just one channel and must be represented by a frequency band map and the corresponding CQI. In one embodiment, a bit map is simply repeated for each spatial channel and the CQI is computed over all of the selected frequency bands in the frequency band subset of the spatial channels. In another embodiment, the bit map and corresponding CQI is reported for less than all, for example, one, of the spatial channels. The selected spatial channel for reporting can be based on highest SNR or SINR metric or some other metric indicating the supported data rate.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device capable of communicating on first and second channels each comprising a plurality of sub-carriers, each channel is divided into a plurality of frequency bands, wherein each frequency band includes at least one sub-carrier, the method comprising:
measuring a channel quality indicator for a plurality of frequency bands in a first channel;
identifying a subset of frequency bands in the first channel for which the channel quality indicator has been measured based on a subset criterion;
sending information identifying the subset of frequency bands in the first channel for which the channel quality indicator has been measured,
sending a subset channel quality indicator value associated with the subset of frequency bands in the first channel;
measuring a channel quality indicator for a plurality of frequency bands in a second channel;
identifying a subset of frequency bands in the second channel for which the channel quality indicator has been measured based on a subset criterion;
sending information identifying the subset of frequency bands in the second channel for which the channel quality indicator has been measured; and
sending a subset channel quality indicator value associated with the subset of frequency bands in the second channel,
wherein the subset channel quality indicator values for the first and second subsets of frequency bands are sent alternately.

2. The method of claim 1, further comprising receiving information identifying the plurality of frequency bands for which the channel quality indicator is to be measured before measuring.

3. The method of claim 1, sending a function of the channel quality indicator measured for the subset of frequency bands.

4. The method of claim 3, sending the function of the channel quality indicator measured includes sending at least one of an average of the channel quality indicators measured for the subset of frequency bands, a minimum channel quality indicator measured for the subset of frequency bands, a median channel quality indicator measured for the subset of frequency bands, or a maximum channel quality indictor measured for the subset of frequency bands.

5. The method of claim 1, identifying the subset of frequency bands for which the channel quality indicator has been measured based on a subset criterion includes
identifying at least one frequency band based on a reference channel quality indicator, and
identifying additional frequency bands having a measured channel quality indicator within a distance of the reference channel quality indicator of the at least one frequency band.

6. The method of claim 1, identifying the subset of frequency bands wherein the maximum size of the subset is less than a number corresponding to the plurality of frequency bands.

7. The method of claim 1, identifying the subset of frequency bands wherein the subset criterion is based on traffic type or data service supported by a network in which the wireless communication device operates.

8. The method of claim 1, identifying the subset of frequency bands for which the channel quality indicator has been measured based on a subset criterion that is based at least partly on Doppler frequency.

9. The method of claim 1, receiving a partial control assignment, constructing a full control assignment from the partial control assignment and the frequency band channel quality indicator measurement information.

10. A wireless communication terminal, comprising:
a transceiver capable of communicating on first and second channels each comprising a plurality of sub-carriers, each channel is divided into a plurality of frequency bands, wherein each frequency band includes at least one sub-carrier;
a processor communicably coupled to the transceiver, the processor is configured for measuring a channel quality indicator for a plurality of frequency bands on the first channel,
the processor is configured for measuring a channel quality indicator for a plurality of frequency bands on the second channel and for identifying, based on a subset criterion, a subset of frequency bands for which the channel quality indicator has been measured on the first and second channels,
the processor is configured to send information identifying the subset of frequency bands for which the channel quality indicator has been measured on the first and second channels and to send a subset channel quality indicator value associated with the subset of frequency bands on the first and second channels, and
the processor is configured to cause the transceiver to alternately transmit channel quality indicator values for the first and second subsets of frequency bands.

11. The terminal of claim 10, the channel quality indicator value includes at least one of an average of the channel quality indicators measured for the subset of frequency bands, a minimum channel quality indicator measured for the subset of frequency bands, a median channel quality indicator measured for the subset of frequency bands, or a maximum channel quality indictor measured for the subset of frequency bands.

12. The terminal of claim 10, identifying additional frequency bands having a measured channel quality indicator within a distance of a reference channel quality indicator of at least one frequency band.

13. A wireless communication terminal, comprising:
a transceiver capable of communicating on a plurality of channels each comprising a plurality of sub-carriers, each channel is divided into a plurality of frequency bands, wherein each frequency band includes at least one sub-carrier;
a processor communicably coupled to the transceiver, the processor configured for measuring a channel quality indicator for a plurality of frequency bands for each of the plurality of channels,
the processor is configured for identifying, based on a subset criterion, a subset of frequency bands for which the channel quality indicator has been measured on each of the plurality of channels,
the processor is configured to send information identifying the subset of frequency bands for which the channel quality indicator has been measured on the first and second channels and to send a subset channel quality indicator value associated with the subset of frequency bands on the first and second channels, and
the processor configured to cause the transceiver to transmit channel quality indicator values for each of the plurality of subsets of frequency bands on a round robin basis.

* * * * *